W. J. GAGNON.
CHAIN.
APPLICATION FILED FEB. 16, 1918.

1,303,649.

Patented May 13, 1919.

Inventor
William J. Gagnon
by his Attorneys

Witness:

UNITED STATES PATENT OFFICE.

WILLIAM J. GAGNON, OF BRIDGEPORT, CONNECTICUT, ASSIGNOR TO THE BEAD CHAIN MANUFACTURING COMPANY, OF BRIDGEPORT, CONNECTICUT, A CORPORATION OF CONNECTICUT.

CHAIN.

1,303,649.  Specification of Letters Patent.  Patented May 13, 1919.

Application filed February 16, 1918. Serial No. 217,718.

*To all whom it may concern:*

Be it known that I, WILLIAM J. GAGNON, a citizen of the United States of America, residing at Bridgeport, in the county of Fairfield and State of Connecticut, have invented a certain new and useful Improvement in Chains, of which the following is a specification.

My invention relates to chains and particularly to chains such as are commonly utilized for operating electric switches. The object of my invention is to produce a chain of novel construction which is stronger than the ordinary chain while retaining the appearance and attractive style of the latter.

Referring to the accompanying drawings.

As ordinarily made, a chain of the present general type comprises a series of independent dumb bell links connected by interposed balls each of which embraces the terposed balls each of which embraces the juxtaposed heads of adjacent links. A chain of this construction is dependent for its strength upon the weight of material employed in the balls since the strain of an effort exerted upon the chain is taken by the metal of the ball at the point at which it surrounds the head of the dumb bell link. A breaking strain on the chain results in spreading the metal of one of the balls by the dumb bell head of one of its interengaged links, so that the link is pulled out of the ball.

In the present construction I have provided a chain having all the appearance and finish of a chain of the type mentioned, but in fact much stronger, while at the same time the metal from which the balls are made, may be markedly lighter without in any way affecting the strength of the chain. Moreover the link element of the chain may be of relatively inexpensive material.

Figure 1:
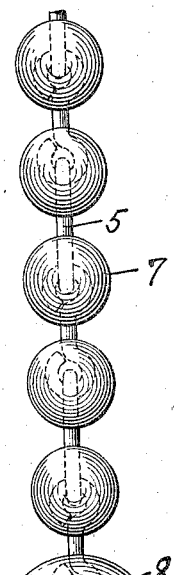
Figure 1 is a side elevation of a chain end in which my invention is embodied in one form.
Figure 2:
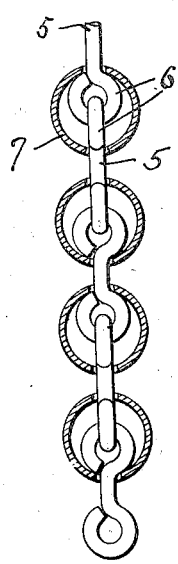
Fig. 2 is a longitudinal section therethrough showing the chain construction.

Referring to Fig. 2, the construction of the present chain is apparent. The links 5 of the chain instead of being of the usual separated dumb bell type, comprise a series of interlocked eye-links forming a continuous core element for the chain and by which is taken the entire strain of an effort exerted upon the chain. This core element of the chain is preferably made from light steel wire and is readily formed in any of the various machines adapted to the manufacture of this type of chain. Around each pair of interengaged eyes 6, which form spaced enlargements of the core element, I form a sheet metal ball 7. This may be accomplished in any suitable manner, but preferably in a machine of the type shown in my Patent No. 1,087,876, eliminating however the link-forming dies and feeding the present core element, previously formed, to the ball-forming dies. These balls have no function in sustaining the effort exerted upon the chain, but impart to the latter the appearance of an ordinary chain. The balls do have the function, however, of affording a more satisfactory hand-grip than would the core of the chain alone, and at the same time they afford antifriction members which permit the chain to run more freely over a surface with which it may be in contact (e. g., a socket chain bell) than would be the case were the core element alone employed.

It is customary to provide a terminal ball 8 of large size to impart a finish and to afford a grip for the chain when the latter is used for operating electric switches and this ball may be formed and secured at the end of a chain length in precisely the same manner as it would be upon the dumb bell link of an ordinary bead chain.

Figure 3:
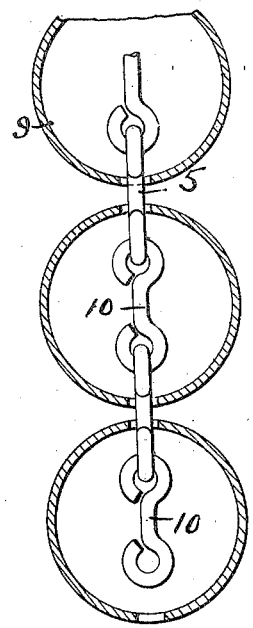
Fig. 3 is a similar view of a modified construction.

In the construction shown in Fig. 3 the links 5 and balls 9 are of such relative size that an entire link 10 is embraced within the ball 9. The latter surrounds not only the confined link 10 but also the eye of the intermediate link 5 so that only the shank of the latter is exposed.

The chain constructed in either manner described possesses substantially the same flexibility as the ordinary ball and link chain and is stronger than the latter for the reasons above pointed out, while at the same time it possesses a substantially identical appearance by reason of the fact that only the shanks of the core links are exposed. The balls form practically four-fifths of the visible portion of the chain and the exposed portion of the intermediate link is in any event in shadow and its difference in material is not noticeable without careful inspection.

I claim as my invention:—

1. A chain comprising a continuous core element having spaced enlargements and hollow balls surrounding said enlargements and held in spaced relationship thereby to simulate an ordinary ball chain.

2. A chain comprising a continuous jointed core element taking the strain of an effort exerted upon the chain, and hollow balls secured upon said core element around the joints of the core element and spaced apart to simulate an ordinary ball chain.

3. A chain comprising a continuous core link-chain taking the strain of an effort exerted upon the chain, and hollow balls secured upon said core element around the link joints and spaced apart to simulate an ordinary ball chain.

4. A chain comprising a series of interlocked links forming a continuous core element taking the strain of an effort exerted upon the chain, and a hollow bead or ball formed upon said core element at each joint between adjacent links and inclosing the joint, said balls being spaced apart to simulate an ordinary bead chain.

5. A chain comprising a continuous core element composed of links having shanks with enlarged heads at opposite ends thereof, the head ends of adjacent links being interconnected together with hollow balls surrounding the interconnected heads and held in spaced relationship thereby to simulate an ordinary ball chain.

In testimony whereof I have signed my name to this specification.

WILLIAM J. GAGNON.